US012766966B2

(12) United States Patent
Heimann et al.

(10) Patent No.: US 12,766,966 B2
(45) Date of Patent: Oct. 20, 2026

(54) VEHICLE CHARGING CIRCUIT WITH RECTIFIER DEVICE, LINK CAPACITOR AND PRECHARGING/DISCHARGE CIRCUIT

(71) Applicant: VITESCO TECHNOLOGIES GMBH, Regensburg (DE)

(72) Inventors: Waldemar Heimann, Munich (DE); Martin Götzenberger, Munich (DE); Walter Schrod, Munich (DE); Thomas Franz, Munich (DE)

(73) Assignee: Schaeffler Technologies AG & Co. KG

(*) Notice: Subject to any disclaimer, the term of this patent is extended or adjusted under 35 U.S.C. 154(b) by 734 days.

(21) Appl. No.: 18/266,054

(22) PCT Filed: Dec. 3, 2021

(86) PCT No.: PCT/EP2021/084083
§ 371 (c)(1),
(2) Date: Jun. 8, 2023

(87) PCT Pub. No.: WO2022/128521
PCT Pub. Date: Jun. 23, 2022

(65) Prior Publication Data

US 2024/0025259 A1 Jan. 25, 2024

(30) Foreign Application Priority Data

Dec. 14, 2020 (DE) ..................... 10 2020 215 784.7

(51) Int. Cl.
*H02J 7/00* (2026.01)
*B60L 3/00* (2019.01)
(Continued)

(52) U.S. Cl.
CPC ............. *B60L 3/0046* (2013.01); *B60L 53/20* (2019.02); *H02M 1/322* (2021.05); *B60L 2210/10* (2013.01)

(58) Field of Classification Search
USPC .......................................................... 320/109
See application file for complete search history.

(56) References Cited

U.S. PATENT DOCUMENTS 8,729,864 B2 5/2014 Dittmer et al.
10,351,004 B1 * 7/2019 Pastor ....................... H02J 7/02
(Continued)

FOREIGN PATENT DOCUMENTS

CN 101997442 A 3/2011
DE 102007047713 A1 4/2009
(Continued)

OTHER PUBLICATIONS

Office Action (Notice to Submit Response) issued Apr. 29, 2025, by the Korean Intellectual Property Office in corresponding Korean Patent Application No. 10-2023-7023604 and an English translation of the Office Action. (9 pages).
(Continued)

*Primary Examiner* — Samuel Berhanu
(74) *Attorney, Agent, or Firm* — Buchanan Ingersoll & Rooney PC

(57) ABSTRACT

A vehicle charging circuit is equipped with a rectifier device, at least one intermediate circuit capacitor and at least one precharge/discharge circuit. The rectifier device is connected to the intermediate circuit capacitor via the precharge/discharge circuit. The precharge/discharge circuit has at least one first changeover switch that is configured, in a first position, to connect a first pole of the intermediate circuit capacitor to a first potential of the rectifier device. In a second position, the changeover switch connects the first pole of the intermediate circuit capacitor to the second pole of the intermediate circuit capacitor via a discharge resistor. The changeover switch is configured to adopt the second switching position in the actuation-free state.

14 Claims, 4 Drawing Sheets

(51) Int. Cl.
*B60L 53/20* (2019.01)
*H02M 1/32* (2007.01)

(56) References Cited

U.S. PATENT DOCUMENTS

| | | | | |
|---|---|---|---|---|
| 2013/0035819 | A1 | 2/2013 | Wolft | |
| 2013/0154579 | A1 * | 6/2013 | Morita .................... | H02J 7/933 320/166 |
| 2014/0211524 | A1 * | 7/2014 | Guyomard .............. | H02M 1/36 363/49 |
| 2019/0202300 | A1 | 7/2019 | Pastor et al. | |
| 2020/0083727 | A1 | 3/2020 | Sun et al. | |
| 2021/0347271 | A1 | 11/2021 | Pfeilschifter et al. | |

FOREIGN PATENT DOCUMENTS

| | | | |
|---|---|---|---|
| DE | 102010015312 | A1 | 10/2011 |
| DE | 102012000840 | A1 | 7/2012 |
| DE | 102018216233 | A1 | 3/2020 |
| DE | 102018221978 | A1 | 6/2020 |
| EP | 2284982 | A1 | 2/2011 |
| JP | 2006246569 | A | 9/2006 |
| JP | 2010141958 | A | 6/2010 |

OTHER PUBLICATIONS

International Search Report and Written Opinion for International Application No. PCT/EP2021/084083, dated Mar. 21, 2022, 11 pages.

International Search Report and Written Opinion for International Application No. PCT/EP2021/084803, dated Mar. 21, 2022, 17 pages (German).

German Examination Report for German Application No. 10 2020 215 784.7, dated Aug. 16, 2021 with translation, 14 pages.

Office Action (The First Office Action) issued Aug. 1, 2025, by the State Intellectual Property Office of People's Republic of China in corresponding Chinese Patent Application No. 202180084420.0 and an English translation of the Office Action. (22 pages).

* cited by examiner

VEHICLE CHARGING CIRCUIT WITH RECTIFIER DEVICE, LINK CAPACITOR AND PRECHARGING/DISCHARGE CIRCUIT

CROSS REFERENCE TO RELATED APPLICATIONS

This application is the U.S. National Phase Applications of PCT International Application No. PCT/EP2021/084083, filed Dec. 3, 2021, which claims priority to German Patent Application No. 10 2020 215 784.7, filed Dec. 14, 2020, the contents of such applications being incorporated by reference herein.

BACKGROUND OF THE INVENTION

Vehicles with an electric drive are often equipped with high-voltage rechargeable batteries, which may output a voltage that is dangerous to humans. Furthermore, such vehicles contain components with energy storage units such as capacitors, which may be charged with the voltage of the rechargeable battery or rectified mains voltage of a charging station, and are therefore also potentially dangerous to humans.

On the one hand, there is an interest in preventing a dangerous contact voltage at a charging connection when the connection is not occupied. On the other hand, there is an interest in avoiding a risk caused by high contact voltages, which may occur for instance due to unprotected contacts or due to faults in the event of a rear-end collision with a charging vehicle.

SUMMARY OF THE INVENTION

One aspect of the present invention is a way in which it is possible to achieve protection against a dangerous contact voltage, in particular with regard to exposed contacts or rear-end collisions with charging vehicles, and also with regard to electrical storage units such as capacitors, which, apart from the rechargeable battery, may also carry a dangerous voltage.

It is proposed to equip a vehicle charging circuit with a rectifier device, at least one intermediate circuit capacitor and at least one precharge/discharge circuit. The precharge/discharge circuit has a changeover switch (generally referred to as "first changeover switch") that connects one pole of the intermediate circuit capacitor selectively to the rectifier device for precharging purposes or to the other pole of the intermediate circuit capacitor in order to discharge it. Owing to the fact that use is made of a changeover switch that connects the pole of the intermediate circuit capacitor selectively to the rectifier or to the discharge resistor, the design of the changeover switch means that the rectifier circuit cannot be connected to the discharge resistor, even in the event of incorrect actuation. This prevents the rectifier from being connected to the discharge resistor and thus permanently supplying voltage thereto in the event of incorrect or delayed disconnection of the charging station or in the event of a fault with the changeover switch. This in particular prevents the discharge resistor from then being able to overheat and fail due to the energy of the rectifier, corresponding to a permanent flow of current.

In the actuation-free state, the changeover switch connects the intermediate circuit capacitor to the discharge resistor and not to the rectifier, such that a flow of current from the rectifier is avoided in the event of actuation failure. This also serves to prevent an incorrect permanent current from the rectifier device and in particular enables functional disconnection of the rectifier device from the downstream components such as the intermediate circuit capacitor and other components.

Three different variants of the circuitry of the changeover switch and of the discharge resistor are illustrated here by way of example, with FIGS. 1 to 3 being associated with a first variant, FIGS. 4, 5 and 8 belonging to a second variant and FIGS. 6 and 7 serving to explain a third variant.

A vehicle charging circuit is described in general, having a rectifier device, at least one intermediate circuit capacitor and at least one precharge/discharge circuit. The vehicle charging circuit is provided in particular in a vehicle (in the sense of a vehicle-side vehicle charging circuit), for instance in an on-board power system of a vehicle, but may also be provided in a charging station.

The vehicle charging circuit and its components are designed in particular for voltages of more than 60 volts, for instance for rated voltages of at least 100, 200, 400 or 800 volts.

The vehicle charging circuit is provided in particular for charging a vehicle traction battery that is designed in accordance with one of said voltages. A DC-DC voltage converter may be connected to the intermediate circuit capacitor and leads for instance to the rechargeable battery or to a rechargeable battery connection.

The precharge/discharge circuit has at least one first changeover switch that is configured, in a first position, to connect a first pole of the intermediate circuit capacitor to a first potential of the rectifier device. This enables the direct connection, that is to say a connection without a (current-limiting) resistive component, between the intermediate circuit capacitor and the rectifier device in order to carry a charging current. In a second position, the changeover switch connects the first pole of the intermediate circuit capacitor to the second pole of the intermediate circuit capacitor via a discharge resistor. The discharge resistor thereby enables a limited flow of current for the purpose of discharging the intermediate circuit capacitor when the second position is present. The term "discharge resistor" means that it is provided for discharging purposes, but this does not rule out other functions such as precharging.

Finally, the changeover switch is configured to adopt the second switching position in the actuation-free state. In this state, the first changeover switch enables connection of the intermediate circuit capacitor via the discharge resistor and thus the limited flow of current for the purpose of discharging the intermediate circuit capacitor (possibly also for precharging the intermediate circuit capacitor; cf. third variant).

The first changeover switch is preferably designed as an electromechanical changeover switch. It has a center connection. The center connection is connected to the intermediate circuit capacitor, in particular to the first pole of the intermediate circuit capacitor, for instance the positive pole. The changeover switch may be connected selectively to a first contact or to a second contact of the changeover switch, wherein the changeover switch is designed in particular such that the center connection is not connected to both contacts at the same time, and also that the two contacts of the changeover switch are not able to be connected to one another at any time. The discharge resistor may be connected to the first contact directly, that is to say via a switch-free connection, or indirectly, that is to say via a further, second changeover switch. The second contact is connected to the rectifier device directly, that is to say preferably without any switches, or indirectly, that is to say via a second changeover switch, in particular via the rectifier already mentioned. In the actuation-free state of the changeover switch, the center connection is connected to the second contact.

In the actuation-free state, the changeover switch is thus in the second switching position. The changeover switch is designed in particular as a relay, wherein a spring force or the like preferably presses the center connection against the second contact and electrically connects same thereto in the actuation-free state. Provision may be made here in particular for a movable contact element that is electrically connected to the center connection (regardless of the state of the changeover switch) and that is connected to the first or the second contact depending on the state of the changeover switch. This prevents the two contacts from being connected to one other or the center connection being connected to both contacts at the same time. The second changeover switch may be designed in the same way as the first switch. However, the second changeover switch is preferably connected in the vehicle charging circuit in a manner different from the first changeover switch.

A DC-DC voltage converter may be connected downstream of the intermediate circuit capacitor. This converter is part of the vehicle charging circuit. If there are multiple intermediate circuit capacitors, one and the same DC-DC voltage converter may be connected downstream of both intermediate circuit capacitors. If there are multiple intermediate circuit capacitors, these may be connected to one another directly in series or may be connected to one another via a configuration circuit, which may be used to set whether the intermediate circuit capacitors are connected to one another in series or in parallel.

A further aspect is that the rectifier device is designed as a passive rectifier, but preferably as an active rectifier and particularly preferably as a power factor correction filter (PFC, power factor correction). A power factor correction filter is the name given in particular to a power factor correction circuit that is configured to actively correct the current form and the phase of the current relative to the input voltage. The rectifier circuit may be of single-phase or multi-phase design and may have an AC voltage connection, which is accordingly of single-phase or multi-phase design. In particular, the rectifier device is of three-phase design, but is designed for single-phase and for three-phase operation.

According to a first variant, the first changeover switch is configured, in the first position, to connect a first pole of the intermediate circuit capacitor, via a switch, to the rectifier device, in particular its first potential. In this case, the precharge/discharge circuit has a precharge resistor and also the switch. This switch is designed as a normally closed contact or (preferably) as a normally open contact. The switch is connected in parallel with the precharge resistor. If the switch is closed, then this bypasses the precharge resistor (and in particular only this). If the switch is open, then the precharge resistor limits the flow of current between the intermediate circuit capacitor and the rectifier. The switch or precharge resistor is connected between the first changeover switch and the rectifier device and preferably forms the sole connection between the changeover switch and the first potential (for instance the positive potential) of the rectifier device. In other words, the first changeover switch is connected to the first potential of the rectifier device via the parallel connection formed from the precharge resistor and the first changeover switch.

The switch is preferably designed as a normally open contact and is therefore open in the actuation-free state, but may also be designed as a normally closed contact. If the vehicle charging circuit is designed with only one and not a plurality of these precharge/discharge circuits, then this preferably also comprises only one intermediate circuit capacitor. In this case, the rectifier device is also of single-phase design. In addition, provision is preferably also made for only one DC-DC voltage converter to be provided, this being connected downstream of the intermediate circuit capacitor. The switch may also be considered as a second changeover switch that is closed in a first position and bypasses the precharge resistor, and, in a second position, establishes a connection to a contact that is not connected any further, and is thus open. The second changeover switch is also preferably configured to adopt the second switching position in a control-free state.

Further embodiments of this first variant make provision for multiple precharge/discharge circuits and multiple intermediate circuit capacitors, in particular two. In this embodiment, provision is preferably furthermore made for a neutral conductor connection, as well as two of the precharge/discharge circuits and two of the intermediate circuit capacitors. These are designed in the same way as the individual precharge/discharge circuits mentioned above. Reference is made below to the connection within the vehicle charging circuit. In this embodiment, the intermediate circuit capacitors are connected to one another via an intermediate point. This intermediate point is preferably connected to the neutral conductor connection, wherein, in the case of a rectifier device that is designed as a Vienna rectifier, this connection to the neutral conductor connection may be dispensed with or may have a symmetry controller. The rectifier device also has a neutral conductor connection and is also preferably of three-phase design. The neutral conductor connection of the rectifier device is connected in particular to the intermediate point between the two intermediate circuit capacitors. The two precharge/discharge circuits and the intermediate circuit capacitors are connected symmetrically about the intermediate point or the neutral conductor connection and are connected to different potentials of the rectifier device. The first of the precharge/discharge circuits is connected between the first potential of the rectifier device and a first of the intermediate circuit capacitors. In this case, the first potential may be the positive potential of the rectifier device, in particular of the DC voltage side of the rectifier device. The second precharge/discharge circuit is preferably connected between the second potential of the rectifier device and the second intermediate circuit capacitor. The second potential is preferably the negative potential of the rectifier device, in particular of the DC voltage side of the rectifier device. The discharge resistors of the two precharge/discharge circuits are preferably connected to one another via the intermediate point. Both discharge resistors are thus connected to the neutral conductor connection. The two precharge resistors and the switches in parallel therewith, that is to say the two parallel connections of the two precharge/discharge circuits, are connected to different potentials of the rectifier device. This results in a first parallel connection of a precharge resistor in a first potential connection between the first potential and the first intermediate circuit capacitor, and a second parallel connection of a precharge resistor and switch in a second potential rail that connects the second potential of the rectifier device to the second intermediate circuit capacitor. In such an embodiment, the rectifier device is of three-phase design, that is to say with three individual phase connections and preferably also with a neutral conductor connection. The rectifier device may also be provided without a neutral conductor connection, but the intermediate point is preferably connected to a neutral conductor connection of the vehicle charging circuit.

In the above embodiment, the two intermediate circuit capacitors are connected to one another directly via a connection point. However, a further embodiment makes provision for them to be connected to one another via a configuration circuit. This configuration circuit is preferably also connected to a neutral conductor connection of the vehicle charging circuit, which may in particular also be connected to an optional neutral conductor connection of the rectifier device. The configuration circuit connects the intermediate circuit capacitors to one another and is configured to selectively connect the intermediate circuit capacitors in parallel or in series. It is also the case for other embodiments and variants that the configuration circuit may have for example two changeover switches and two diodes that are connected to one another in series via a diode connection point. This diode connection point is connected to the neutral conductor connection of the vehicle charging circuit and optionally also to the rectifier device. The changeover switches selectively connect the intermediate circuit capacitors to one another directly and in series by bypassing the diodes, or connect both intermediate circuit capacitors to a potential of the rectifier device, such that both capacitors are connected to one another in parallel and both capacitors are connected in parallel to the two potentials of the rectifier device.

If provision is made for a configuration circuit, then the rectifier device is preferably also of three-phase design. If multiple intermediate circuit capacitors are provided, the rectifier device may be of three-phase design. Provision may be made for a controller that is able to actuate the rectifier device selectively in the single-phase or in the three-phase operating state, wherein this controller is preferably also connected to the configuration circuit. In the single-phase operating state, the controller preferably actuates the configuration circuit so as to connect the capacitors to one another in parallel, and, in the three-phase state of the rectifier device, actuates the configuration circuit so as to connect the intermediate circuit capacitors to one another in series. This results, in three-phase operation, which entails a higher DC output voltage of the rectifier device than single-phase operation, in in each case half the output voltage for the individual intermediate circuit capacitors, whereas, in single-phase operation, the capacitance of the two capacitors is added due to the parallel connection, and thus the ripple of the rectified voltage of the rectifier device, which ripple is higher compared to three-phase operation, is able to be smoothed better. Due to the fact that the two intermediate circuit capacitors only receive half the output voltage in series operation, they may be designed in line with a lower rated voltage, or a higher input voltage may be used with the same rated voltage design of the capacitors.

A description has thus been given of a first embodiment of the first variant, which has only a single precharge/discharge circuit and a single intermediate circuit capacitor, wherein the rectifier device is preferably of single-phase design. A second and third embodiment of the first variant make provision for multiple precharge/discharge circuits and multiple intermediate circuit capacitors, as well as a direct series connection of the capacitors, whereas a third embodiment of the first variant makes provision for the intermediate circuit capacitors to be connected via a configuration circuit that enables the intermediate circuit capacitors to be selectively connected in series or in parallel.

A second variant makes provision for the precharge/discharge circuit of the vehicle charging circuit to have a second changeover switch in addition to the first changeover switch. In the first switching position of the first changeover switch, the second changeover switch is not connected to the first changeover switch. In the second position of the first changeover switch, the first changeover switch connects the first pole of the intermediate circuit capacitor to the second changeover switch. The second changeover switch is configured, in a first position, to connect the first changeover switch to the first potential of the rectifier device via a precharge resistor and, in a second position, to connect the first changeover switch to the second pole of the intermediate circuit capacitor via the discharge resistor. In other words, provision is made for a discharge resistor and a precharge resistor as a further resistor, wherein the second changeover switch serves to connect the first changeover switch selectively to the precharge resistor or the discharge resistor. The second changeover switch may thus be used to select between discharge mode and precharge mode. The first changeover switch serves here to select whether there should be a direct connection between the rectifier device or intermediate circuit capacitor, or whether precharging or discharging should take place, and thus the intermediate circuit capacitor is connected to one of said two resistors via the second changeover switch and there is therefore no direct, resistance component-free connection between the intermediate circuit capacitor and the first potential of the rectifier device. In this and in all variants that provide a precharge resistor separately from a discharge resistor, the discharge resistor may be designed for a higher power than the precharge resistor. This enables fast discharging, which is particularly relevant to safety, whereas the precharge resistor may be designed with a lower rated or maximum power and may therefore be designed in a cost-saving manner.

A first embodiment of this (second) variant makes provision for only one precharge/discharge circuit and also only one intermediate circuit capacitor to be provided. In this case, the rectifier device is preferably of single-phase design. If provision is made for a DC-DC voltage converter, then there is preferably only one DC-DC voltage converter, which is connected downstream of the single intermediate circuit capacitor. Embodiments of this second variant are set forth below, in which embodiments provision is made for multiple intermediate circuit capacitors and multiple precharge/discharge circuits.

A first embodiment of the second variant makes provision for multiple intermediate circuit capacitors that are connected in series. Provision is made in particular for two intermediate circuit capacitors that are connected to one another via a connection point, which may be connected in particular to a neutral conductor connection of the vehicle charging circuit. This connection may also optionally be connected to a neutral conductor connection of the rectifier device. The two precharge/discharge circuits (and the two intermediate circuit capacitors) are assigned to different potentials of the rectifier device. A first of the precharge/discharge circuits is connected between the first potential of the rectifier device and a first of the intermediate circuit capacitors. A second of the precharge/discharge circuits is preferably connected between the second potential of the rectifier device and a second of the intermediate circuit capacitors. The first potential is preferably the positive potential and the second potential is the negative potential of the rectifier device or of the DC voltage side of the rectifier device. The discharge resistors of the two precharge/discharge circuits are in particular connected to one another via the intermediate point. The two precharge resistors connect the respective second changeover switch of the precharge/discharge circuits to different potentials of the rectifier device. The vehicle charging circuit is equipped with precharge/discharge circuits and intermediate circuit capacitors that are connected symmetrically with respect to the neutral conductor connection or the connection point between the intermediate circuit capacitors. In the case of multiple intermediate circuit capacitors, these preferably have the same capacitance and are preferably also designed for the same voltage.

After the second embodiment of the second variant set forth above provides a fixed connection of the intermediate circuit capacitors, that is to say a series connection, a third embodiment of the second variant is set forth below, in which provision is made for a configuration circuit.

In the third embodiment of the second variant, provision is made for a configuration circuit via which the two intermediate circuit capacitors are connected to one another. The configuration circuit is configured to selectively connect the intermediate circuit capacitors in parallel or in series. There is in particular a neutral conductor connection of the vehicle charging circuit. This is preferably connected to the configuration circuit. In this case, the configuration circuit may correspond to the configuration circuit set forth above.

In the third embodiment of the second variant, like in the second embodiment of the second variant, the first of the precharge/discharge circuits is connected between the first potential of the rectifier devices and a first of the intermediate circuit capacitors. A second of the precharge/discharge circuits is connected between the second potential of the rectifier device and a second of the intermediate circuit capacitors. The discharge resistors of the two precharge/discharge circuits are connected to one another via the configuration circuit. This results from the fact that the intermediate circuit capacitors are connected to one another via the configuration circuit and the respective precharge/discharge circuits are connected in parallel to the respective intermediate circuit capacitors. The two precharge resistors connect the respective second changeover switch of the precharge/discharge circuits to different potentials of the rectifier device.

In the third embodiment, the rectifier device is designed in particular for single-phase and three-phase operation, wherein the configuration circuit provides a parallel connection in single-phase operation and a series connection in three-phase operation.

A third variant makes provision for the precharge/discharge circuit or each precharge/discharge circuit to have a second changeover switch that is connected to the first changeover switch via the discharge resistor. In this case, the second changeover switch connects the discharge resistor selectively to the rectifier device (for precharging purposes, or to the intermediate circuit capacitor) in order to discharge same. As in the second variant, the first changeover switch is intended here to selectively provide either a direct connection between the one or more intermediate circuit capacitors, on the one hand, and the rectifier device, on the other hand, or to provide a precharge or discharge path via the second changeover switch. The second changeover switch serves here to select whether one and the same resistor is connected to the rectifier device or to the intermediate circuit capacitor. In this case, the (at least one) precharge/discharge circuit has a second changeover switch in addition to the first changeover switch. The first changeover switch is configured, in the second position, to connect the first pole of the intermediate circuit capacitor, via the discharge resistor, to the second changeover switch, which is connected to the second pole of the intermediate circuit capacitor. The second changeover switch is configured, in a first position, to connect the discharge resistor to the first potential of the rectifier device.

This gives the discharge resistor the additional function of precharging, wherein, as mentioned, the second changeover switch serves to set the discharging or precharging function. In the second position, the second changeover switch connects the first changeover switch to the second pole of the intermediate circuit capacitor via the discharge resistor. This results in a discharging function for the intermediate circuit capacitor. Due to its dual function, this may also be referred to as a precharge/discharge resistor. If the rectifier device is of only single-phase design, then provision is preferably also made for only one precharge/discharge circuit, and the (single) intermediate circuit capacitor is connected in parallel to the two potentials of the rectifier device.

In further embodiments, the vehicle charging circuit is equipped with multiple or two precharge/discharge circuits, wherein, in these embodiments, the rectifier device is preferably designed for three-phase operation (possibly in addition to a single-phase operating mode).

A second embodiment of the third variant therefore makes provision for there to be two precharge/discharge circuits and two intermediate circuit capacitors. The intermediate circuit capacitors are connected to one another via an intermediate point. This intermediate point may be connected to a neutral conductor connection of the vehicle charging circuit. A first of the precharge/discharge circuits is connected between the first potential of the rectifier device and a first of the intermediate circuit capacitors. The second of the precharge/discharge circuits is connected between the second potential of the rectifier device and a second of the intermediate circuit capacitors. The second changeover switches of the two precharge/discharge circuits are connected to one another via the intermediate point. This results from the fact that the intermediate circuit capacitors are also connected to one another via an intermediate point and the respective precharge/discharge circuit is connected in parallel to the associated intermediate circuit capacitor.

The two first changeover switches connect the respective discharge resistor of the precharge/discharge circuit in question to different potentials of the rectifier device. In this case, in contrast to the single-phase embodiments or the vehicle charging circuits with only one precharge/discharge circuit and only one intermediate circuit capacitor, a respective precharge/discharge circuit is provided in both potential rails, wherein the potential rails connect the intermediate circuit capacitors to the rectifier devices.

A third embodiment of the third variant does not make provision for a rigid, series connection between the intermediate circuit capacitors, but rather a connection via a configuration circuit. Said configuration circuit is configured to selectively connect the intermediate circuit capacitors in parallel or in series. An optional neutral conductor connection is connected to the configuration circuit. In this case too, the configuration circuit is preferably configured to connect the intermediate circuit capacitors in parallel when the rectifier device is in single-phase operation (is in single-phase mode), and provides a series connection between the capacitors when provision is made for three-phase operation of the rectifier device.

Embodiments according to the third variant allow the use of one and the same resistor to take on the function of discharging and precharging. This is possible in particular since discharge phases and precharge phases usually do not follow one another directly and relatively frequently, and so the resistor does not overheat when designed appropriately.

The resistors mentioned here are preferably PTC resistors and have protection against overheating due to their temperature-dependent resistance value. If a fault occurs, the PTC resistor heats up, as a result of which the resistance value increases and the PTC resistor brings about an electrical disconnection. During the cooling time, which may be in the range of a few minutes, it is possible to rectify the cause of the fault. During the cooling time, the charging station may be electrically disconnected, for instance by disconnecting the rectifier device from an AC charging connection of the circuit or by disconnecting the connection, outside the vehicle, between the charging station or the energy source of the charging station and the vehicle.

The vehicle charging circuit may furthermore be designed to perform at least one of the following functions that serve to ensure safety. The vehicle charging circuit in particular comprises, for this purpose, a monitoring unit that is configured to implement at least one of the following functions.

A first function, in particular of the monitoring unit, is to monitor a voltage across the at least one intermediate circuit capacitor, for instance by way of an appropriately connected voltage detection device, wherein a fault signal is output (in particular by the monitoring unit) if a predefined voltage limit is exceeded by the detected voltage on the intermediate circuit capacitor. The voltage limit may in this case reflect the design of the at least one intermediate circuit capacitor, possibly including a safety margin.

A second function, in particular of the monitoring unit, is to monitor the power consumed by the discharge resistor and, from the power, to form a temperature increase of the discharge resistor resulting from the power, and to output a fault signal if the temperature increase is above a limit. One variant of this is to determine the temperature increase on the basis of the power, possibly over the duration of an associated time period. The fault signal may be output if the temperature increase exceeds a limit, if the temperature derived from the temperature increase exceeds a limit that may be based on the temperature design of the discharge resistor and possibly takes into account an ambient temperature of the discharge resistor, or if the temperature increase is above a predefined limit within a predefined duration.

A third function, in particular of the monitoring unit, is to ascertain whether complete discharging of the at least one intermediate circuit capacitor is not possible, or not possible within a predefined period of time. The vehicle charging circuit and in particular the monitoring unit are configured to charge the at least one intermediate circuit capacitor again if this is the case.

A fourth function, in particular of the monitoring unit, is to output a fault signal if complete discharging takes longer than a predefined period of time.

Complete discharging is defined as discharging by a predefined energy difference, for instance discharging by 80% or 90% or 95% of the nominal total capacitance of the at least one intermediate circuit capacitor. As an alternative, complete discharging is defined as discharging to or below a voltage value that is below a safety limit, for instance to a voltage value of less than 60 V, 40 V, 20 V or 5 V, or below.

One, several or all of these functions are implemented in the vehicle charging circuit, in particular essentially in the monitoring unit. Said monitoring unit may be integrated with the controller or be implemented by the same hardware, or exchange data therewith (directly or indirectly). It is possible for these functions to be implemented generally in a vehicle charging circuit—for instance in the form of a monitoring unit—which has at least one intermediate circuit capacitor and at least one discharge resistor and which does not necessarily have the features of the embodiments described here.

BRIEF DESCRIPTION OF THE DRAWINGS

FIGS. 1 to 3 illustrate examples of the first variant, in which FIG. 1 illustrates a vehicle charging circuit with a single precharge/discharge circuit. FIGS. 2 and 3 show embodiments with multiple precharge/discharge circuits, wherein, in FIG. 2, the associated intermediate circuit capacitors are connected directly and, in FIG. 3, the intermediate circuit capacitors are connected to one another via a configuration circuit.

Further examples that may be associated with the second variant are illustrated in FIGS. 8, 5 and 4, wherein FIG. 8 illustrates a vehicle charging circuit with a single precharge/discharge circuit and FIGS. 5 and 4 illustrate exemplary charging circuits with multiple precharge/discharge circuits. In this case, in FIG. 5, the intermediate circuit capacitors are connected directly to one another, whereas, in FIG. 4, the intermediate circuit capacitors are connected by way of a configuration circuit.

FIGS. 6 and 7 serve to explain embodiments that may be associated with the third variant. FIGS. 6 and 7 illustrate vehicle charging circuits that have multiple intermediate circuit capacitors. In FIG. 6, these are connected to one another via a configuration circuit, and in FIG. 7, the intermediate circuit capacitors are connected directly to one another.

Components that are denoted using the same reference signs are comparable and are in particular of the same design. The arrows r and g represent current flows, where g represents a precharge current flow and r represents a discharge current flow. These serve to explain the precharging/discharging function.

DETAILED DESCRIPTION OF THE PREFERRED EMBODIMENTS

Some figures illustrate a DC-DC voltage converter W, which is connected downstream of the intermediate circuit capacitors. Said DC-DC voltage converter is optional and may also be present in embodiments of figures that do not explicitly illustrate the converter. Instead of the DC-DC voltage converter W, provision may also be made for rechargeable battery connections or on-board power system branch connections that serve for connection to a rechargeable battery or to an on-board power system branch (possibly with a rechargeable battery).

Figure 1:
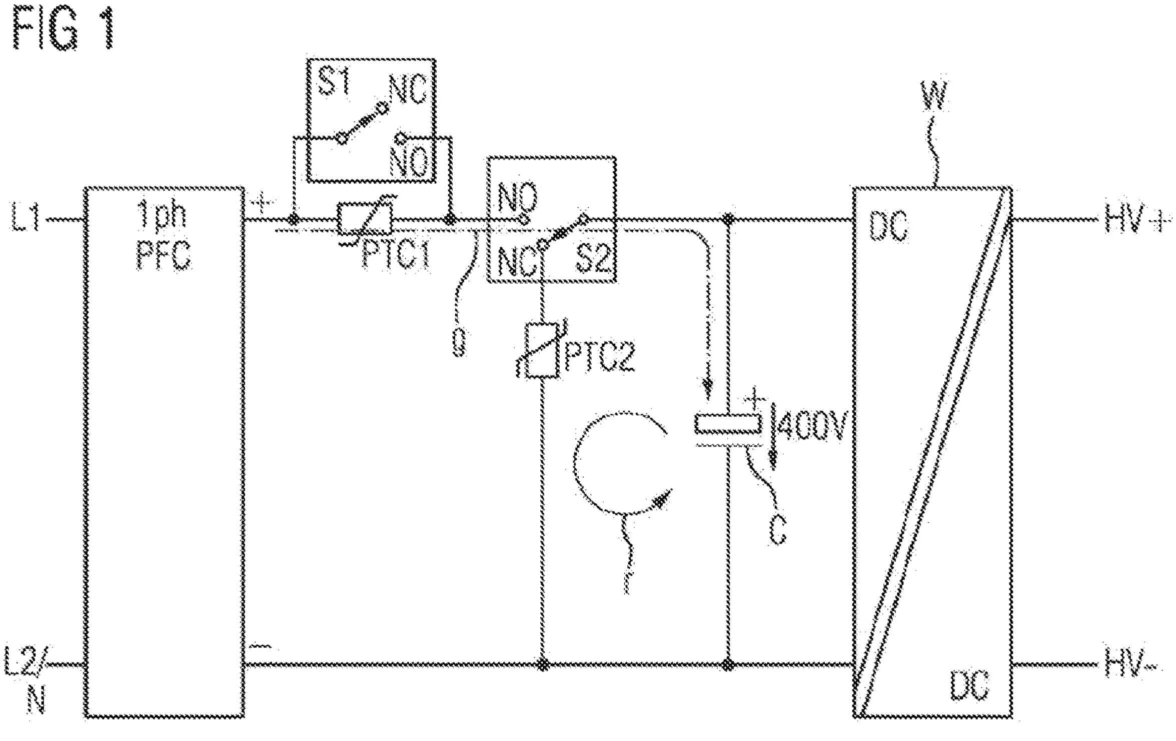
FIGS. 1 to 8 illustrate vehicle charging circuits by way of example, which are intended to serve to aid understanding of the implementation options, variants and embodiments illustrated here.

FIG. 1 shows a vehicle charging circuit with a rectifier device that is designed as a power factor correction filter PFC. The rectifier device PFC is of single-phase ("1ph") design and has a first phase input L1 and a neutral conductor input N. When using two phases to supply power to the rectifier device PFC, a second phase signal L2 may also be applied to the lower input. The inputs L1 and L2/N are therefore AC voltage inputs. A DC voltage side with a first potential + and a second potential − is located on the opposite side of the rectifier device. An intermediate circuit capacitor C, which in turn is connected to a galvanically isolating DC-DC voltage converter W, is connected via a precharge/discharge circuit that is explained in more detail below. That side of the DC-DC voltage converter W facing away from the intermediate circuit capacitor C has two DC voltage connections HV+, HV−.

In FIG. 1, there is a (first) changeover switch S2, which connects a first pole + of the intermediate circuit capacitor C selectively to a discharge resistor PTC2 or to a parallel connection of a switch S1 and a precharge resistor PTC1. In the non-actuated state, the first changeover switch S2 is in the position NC and connects the first pole + of the intermediate circuit capacitor C to the discharge resistor PTC2. For direct charging, the changeover switch S2 in the first circuit is LO and connects the first pole + of the intermediate circuit capacitor C to the precharge resistor PTC1 and the first switch S1. If the switch S1 is open, position NC, then precharging may be performed. If the switch S1 is closed, position NO, then the precharge resistor PTC1 is bypassed and the rectifier device PFC, or its first potential +, is connected directly to the intermediate circuit capacitor C via the switch S1 and the changeover switch S2. When discharging, the changeover switch S2 is in the second position, wherein, in this position, the first potential + of the rectifier device PFC is isolated from the first pole + of the intermediate circuit capacitor C by the changeover switch S2. A permanent flow of current in the event of incorrect actuation, from the rectifier device PFC through the discharge resistor PTC2, is thus ruled out.

FIG. 1 is a single-phase vehicle charging circuit, in which a voltage of 400 volts typically occurs at the intermediate circuit capacitor C. Further embodiments (FIGS. 2 to 7) show three-phase designs in which higher voltages are present at the potentials +, − of the rectifier devices PFC.

Figure 2:
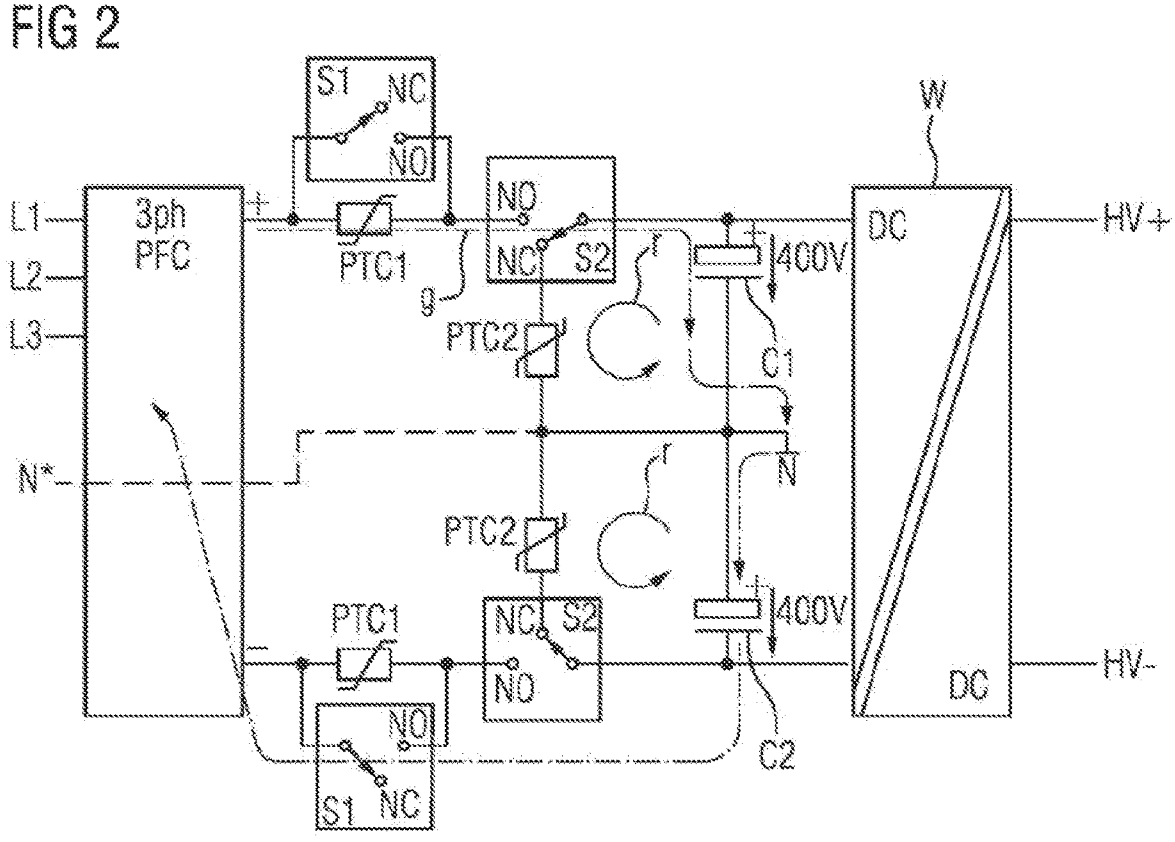

FIG. 2 shows a multi-phase vehicle charging circuit (three-phase) with a three-phase rectifier device, the three phase connections L1 to L3 and a neutral conductor connection N. The latter is optional and is therefore provided with an asterisk and, for this reason, is connected to the discharge circuits via a dashed line.

The circuit in FIG. 2 has two discharge circuits, with these being designed symmetrically with respect to a connection point between the two intermediate circuit capacitors C1 and C2. Provision is thus made for a precharge/discharge circuit in each potential rail +, − (connected to the potentials in question) by way of which the rectifier device PFC is connected to the intermediate circuit capacitors C1, C2. Both precharge/discharge circuits have the same design as the precharge/discharge circuit illustrated in FIG. 1. The intermediate circuit capacitors C1, C2 are connected to one another via a connection point. In contrast to the discharge resistor PTC2 in FIG. 1, which is present between the first changeover switch S2 and the second potential, the discharge resistors PTC2 in FIG. 2 are connected between the respective first changeover switches S2 and the connection point between the intermediate circuit capacitors C1, C2. The potential of the intermediate point thus takes the place of the potential to which the discharge resistor is directly connected in FIG. 1.

In FIG. 2, the connection point is also connected to the neutral conductor connection N. Due to the multi-phase nature, the rectifier device PFC (three-phase, 3ph) generates a higher output voltage at the two potentials +, −, such that a voltage of 400 volts is able to drop across each of the series-connected intermediate circuit capacitors C1, C2.

If the switches S1 are open and the changeover switch S2 is in the position NO, then a precharge current is carried through the resistors PTC1. For subsequent charging, the switches S1 are closed (position NC) and the changeover switch S2 is in the position NO. This results in a direct connection between the rectifier device PFC and the intermediate circuit capacitors C1, C2.

A direct connection denotes in particular a connection that does not have any resistive component that noticeably reduces the flow of current. A shunt resistor (for instance with a value of <1 ohm or <10 mOhm) does not fall within this wording.

Figure 3:
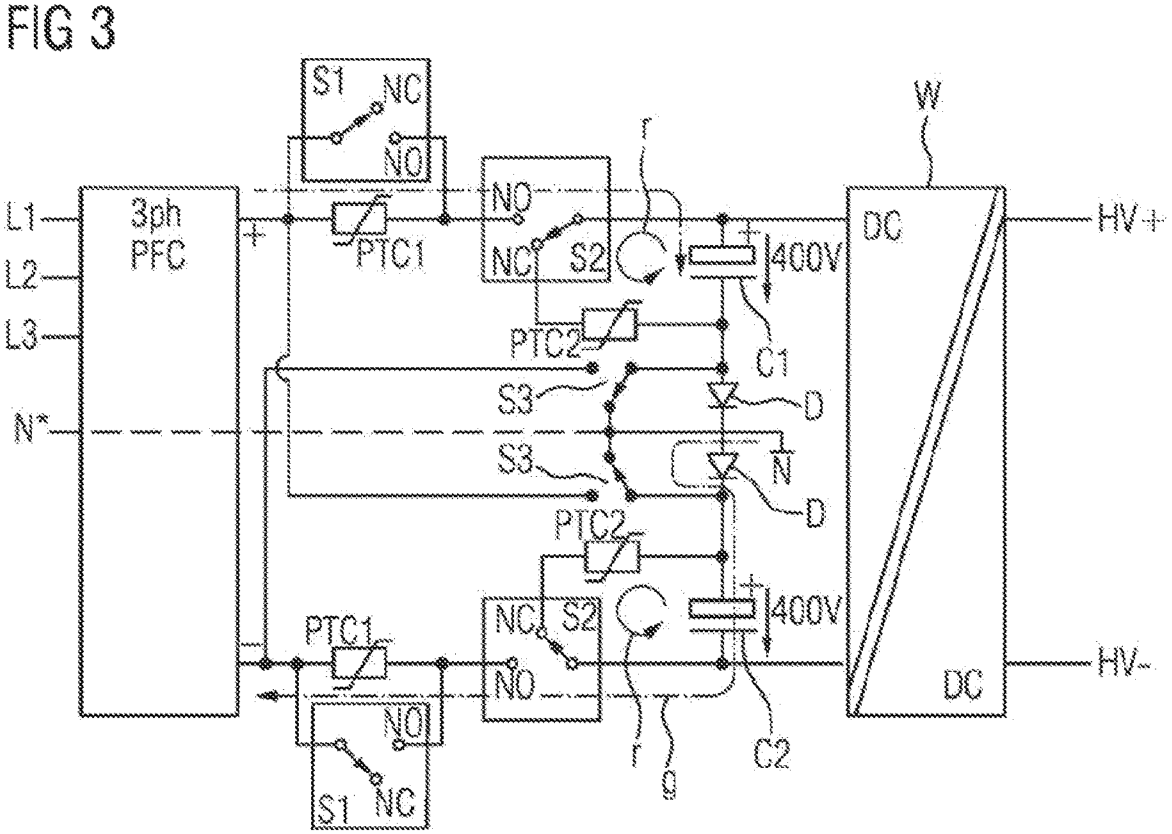

FIG. 3 shows a circuit similar to that of FIG. 2. In contrast to FIG. 2, the intermediate circuit capacitors C1, C2 are connected to one another not directly, but rather via a configuration circuit. In the example illustrated, said configuration circuit has a series connection of two diodes D whose connection point is connected to the neutral conductor N. This makes is possible to divert asymmetrical three-phase current components to the neutral conductor. The configuration circuit also has two switches S3. Each switch S3 is connected to a pole of one of the intermediate circuit capacitors C1, C2 that is not connected directly to one of the changeover switches S2. Each of the changeover switches S3 may selectively connect this pole to the opposing potential of the rectifier device +, − (when the intermediate circuit capacitors are connected in parallel), or, as illustrated, may connect said two poles of the intermediate circuit capacitors C1, C2 to one another, bypassing the diodes D. However, other configuration circuits are also generally conceivable, for instance configuration circuits with two first switches that connect the two intermediate circuit capacitors in parallel to the potentials +, − and a third switch that, in the closed slate, connects the two intermediate circuit capacitors in series. A diode may also be used instead of said switch. The embodiment illustrated makes provision for the configuration circuit to connect the intermediate circuit capacitors to the potentials +, − of the rectifier device PFC (and not to the potentials of the intermediate circuit capacitors, that is to say the potentials to which the respective center connection of the first changeover switch S2 is connected).

Figure 4:
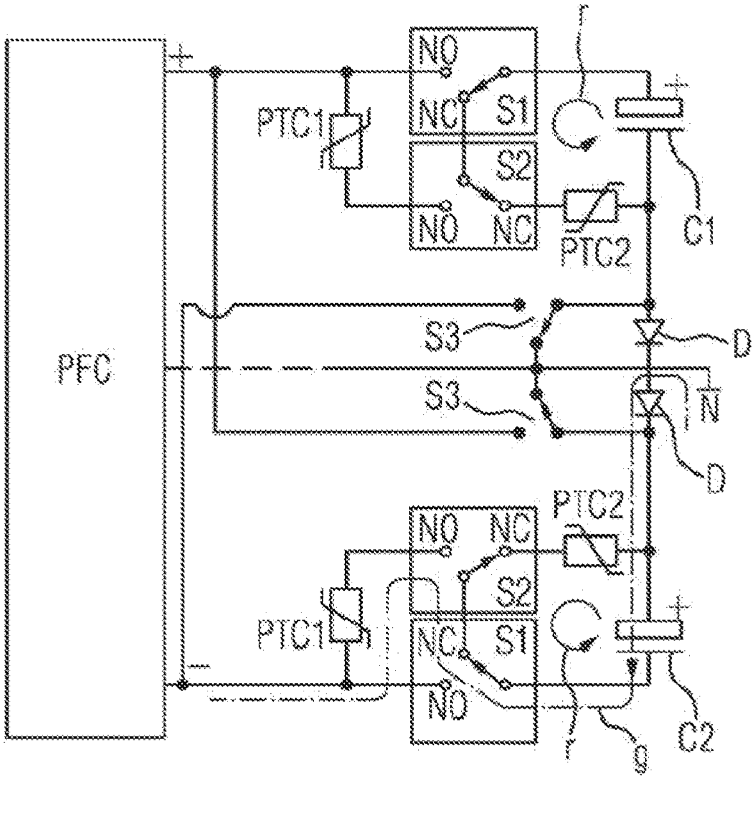
Figure 5:
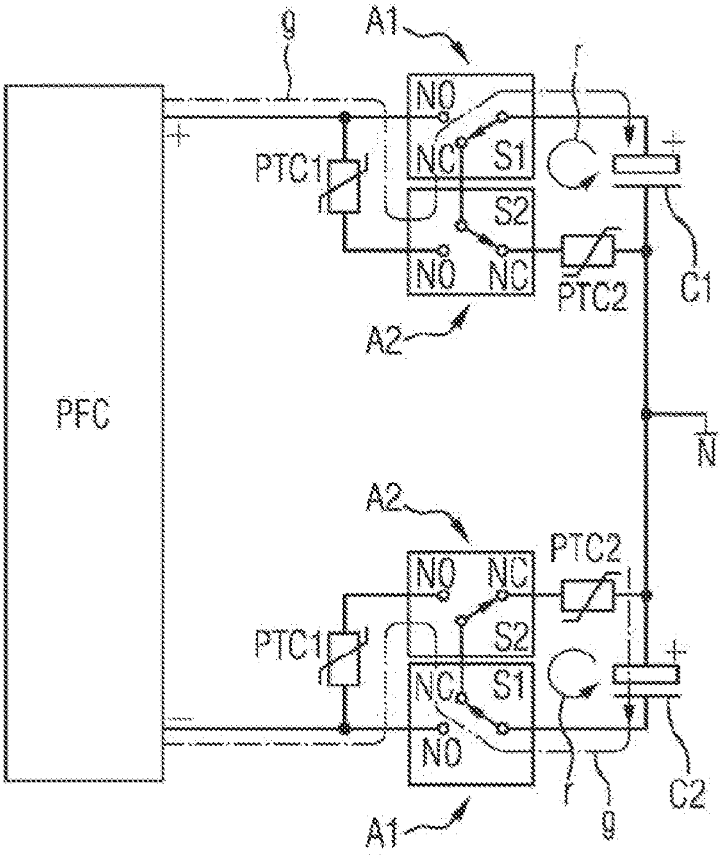

FIGS. 4 and 5 show a further (second) variant of precharge/discharge circuits, in which a first changeover switch connects the first potential (possibly also the second potential) to the intermediate circuit capacitor or to the associated one of multiple intermediate circuit capacitors. The associated intermediate circuit capacitor may be connected selectively by the first changeover switch (here: S1) to the associated first potential + (or else second potential −), corresponding to a first position NO, and, in a second position NC, to a second changeover switch S2. The second changeover switch S2 of each precharge/discharge circuit connects the first changeover switch S1 selectively, via a precharge resistor PTC1, to the potential of the rectifier device, to which the first changeover switch S1 is also connected, corresponding to a position NO, or, in a position NC, to a discharge resistor PTC2 that leads to the potential opposing the potential of the rectifier device, which potential is connected directly to the changeover switch S1. This may be seen clearly from the single-phase design in FIG. 8.

Figure 8:
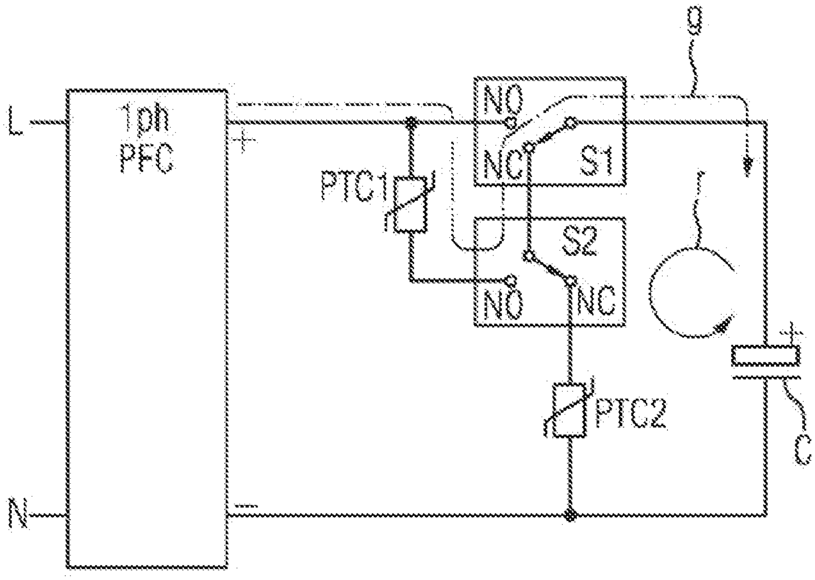

FIGS. 4 and 5 each illustrate an exemplary charging circuit that uses the principle illustrated in FIG. 8. FIG. 8 in this case shows a charging circuit with only one precharge/discharge circuit and one intermediate circuit capacitor C, whereas FIGS. 4 and 5 illustrate a symmetrical voltage supply, wherein the illustrated vehicle charging circuit has two precharge/discharge circuits and two intermediate circuit capacitors C1, C2. The principle illustrated in FIG. 8 is to connect the intermediate circuit capacitor C, from the rectifier device PFC, via the first changeover switch S1. In FIG. 8, the rectifier device PFC is illustrated only in single-phase ("1ph") form and has a neutral conductor input N and a phase input, in contrast to the rectifier device in FIGS. 4 and 5, which are designed for three-phase operation ("3ph"). In a first position NO of the changeover switch S1, the intermediate circuit capacitor C is connected directly to the two potentials +, − of the rectifier device PFC. In the second position NC of the first changeover switch S1, the intermediate circuit capacitor is connected, via the first changeover switch S1, to the second changeover switch S2, which, in a first position NO, connects the first changeover switch S1 to the first potential of the rectifier device via a precharge resistor PTC1 and, in a second position NC, connects the first changeover switch S1 to the second pole of the intermediate circuit capacitor C via the discharge resistor. In this case, the first pole of the capacitor C is connected, via the second changeover switch S2, via the discharge resistor PTC2, in the position NC, to the second pole of the intermediate circuit capacitor. This results in the discharge current path r. The precharge current path g results when the first pole of the intermediate circuit capacitor is connected to the first pole of the rectifier device via the first changeover switch (position NC) and the second changeover switch (position NO) via the precharge resistor PTC1. If the first changeover switch S1 is in the position NO, then the resistor PTC1 and also the second changeover switch are bypassed and this results in a direct path from the rectifier device PFC to the intermediate circuit capacitor C.

This is used in FIG. 4 in both precharge/discharge circuits. In FIG. 4, the intermediate circuit capacitors C1, C2 are connected to one another via a configuration circuit. This has two diodes D and two changeover switches S3, which are together configured to selectively connect the intermediate circuit capacitors C1, C2 to one another in parallel or in series. If, in FIG. 4, the first changeover switches S1 are in the position NO, this results in a direct connection between the rectifier device PFC and the intermediate circuit capacitors C1, C2 (which are connected to one another via the configuration circuit). If the first changeover switches S1 are in the switching position NC, the second changeover switches S2 may be used to select whether the first pole of the intermediate circuit capacitor (for C1, this is +, and for C2, this is the negative pole − due to the symmetry) if the first changeover switches are connected to the precharge resistor PTC1 or to the discharge resistor PTC2. The first pole (see reference sign + for C1) of the respective intermediate circuit capacitor C1, C2 is connected to the second pole (see reference sign + for C2) via the resistors PTC2 if the changeover switches S2 are in the position NC. In the position NO of the second changeover switches S2, this results in the first poles of the intermediate circuit capacitors C1, C2 being connected to the respective potential +, − of the rectifier device PFC to which the respective precharge/discharge circuit is connected.

A neutral conductor connection N is connected to the connection point between the two diodes D and to the connection point of the changeover switches S2, wherein these connection points are connected to one another. Optionally, a neutral conductor of the rectifier device PFC may be connected to the connection points or to the illustrated connection N, this being indicated by the dashed line. FIG. 4 uses the reference sign r to illustrate current paths for discharging and the reference sign g to illustrate an exemplary precharge path via the resistor PTC1.

FIG. 5 shows a further example of a vehicle discharge circuit with two precharge/discharge circuits that operate according to the principle of the precharge/discharge circuit in FIG. 8 or according to the principle of FIG. 4. In this case too, provision is made for two intermediate circuit capacitors C1, C2 which however, in contrast to FIG. 4, are connected directly to one another. The connection point in question is connected to the neutral conductor N. In this case too, the connection point between the intermediate circuit capacitors C1, C2 may optionally be connected to a neutral conductor N of the rectifier device (or the vehicle charging circuit). Otherwise, the discharge circuits correspond to the discharge circuits in FIG. 4. Discharge paths r and precharge paths g are also illustrated here.

In embodiments that are illustrated for instance in FIGS. 4, 5 and 8 by way of example, it is possible for only the first changeover switch S1 to be designed to carry the charging current (that is to say the load current that occurs during charging). Since the one or more changeover switches S2 have to carry either only a precharge current or only a discharge current, they may be designed with a low current-carrying capacity. The switches S1 are thus designed with a higher current-carrying capacity A1 than the current-carrying capacity A2 of the second changeover switches S2. By way of example, for instance with regard to the examples in FIGS. 4, 5 and 8, the at least one first changeover switch may be designed with a rated current-carrying capacity A1 or a maximum current-carrying capacity that is twice as great, or greater at least by a factor of 4, 10 or 20, than the rated or maximum current-carrying capacity A2 of the second changeover switch S2.

Finally, further exemplary embodiments based on the third variant are explained with reference to FIGS. 6 and 7. If considering only one of the two precharge/discharge circuits in FIGS. 6 and 7, for instance, then the respective intermediate circuit capacitor C1 or C2 therein is connected to the first potential of the rectifier device + or − via the first changeover switch S1. This concerns the first position NO of the first changeover switch S1. In a second position NC of the changeover switch S1, the first pole of the intermediate circuit capacitor (which is connected to the rectifier device when S1 is in the switching position NO) is connected to the resistor PTC, which in turn leads to the second changeover switch S2. Using the second changeover switch, the resistor PTC may be connected either to the rectifier device PFC or to the intermediate circuit capacitor C1, C2, depending on whether precharging or discharging is desired. In this case too, the second changeover switch S2 may be designed with a lower current-carrying capacity than the first changeover switch S1, since this changeover switch S2 only has to carry precharge and discharge currents, but no charging currents (that is to say load currents of the charging process or a feedback process). It should also be noted that only one resistor PTC is required, which, depending on the switching position of the changeover switch 2, is a resistor with a precharging function or a resistor with a discharging function.

Figure 6:
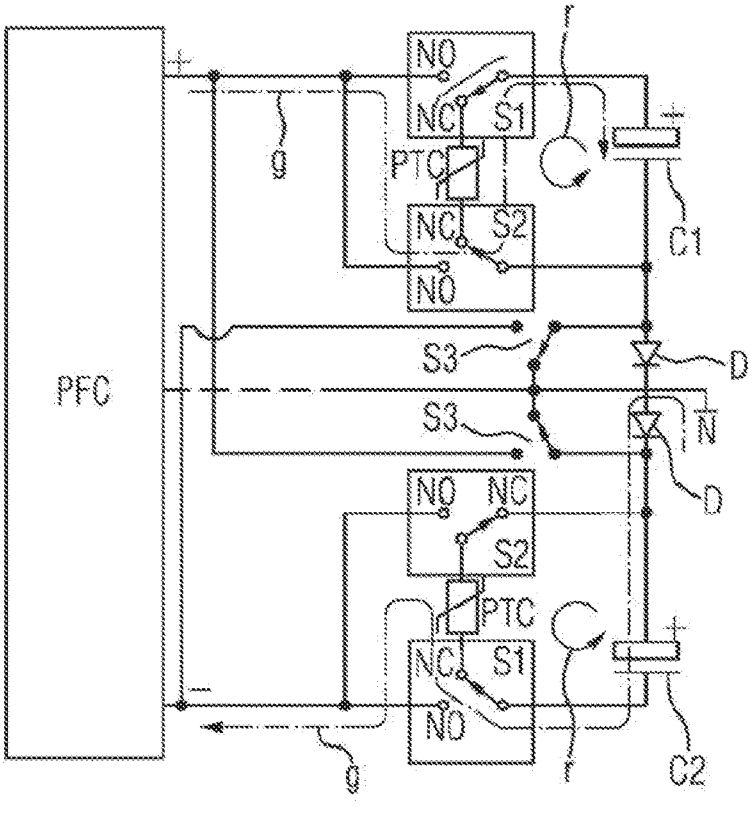

FIG. 6 illustrates two of these precharge/discharge circuits, one being present in each case in a busbar + or −, wherein the busbars are the connections between the rectifier device and the intermediate circuit capacitors C1, C2. The configuration circuit, by way of which the intermediate circuit capacitors C1, C2 are able to be connected to one another in parallel or in series in FIG. 6, has already been described above. In summary, the configuration circuit in FIG. 6, like the other configuration circuits, has two diodes D that are connected in series, wherein the connection point in question is connected to the neutral conductor connection N, whereas the two changeover switches S3 establish a selectable connection such that the capacitors C1, C2 are connected to one another either in parallel or in series. In the case of a series connection, the changeover switches S3 short-circuit or bypass the diodes D. A connection of the illustrated neutral conductor connection N to a neutral conductor connection of the rectifier device PFC is possible as an option, with this applying to FIG. 6 and to FIG. 7.

Figure 7:
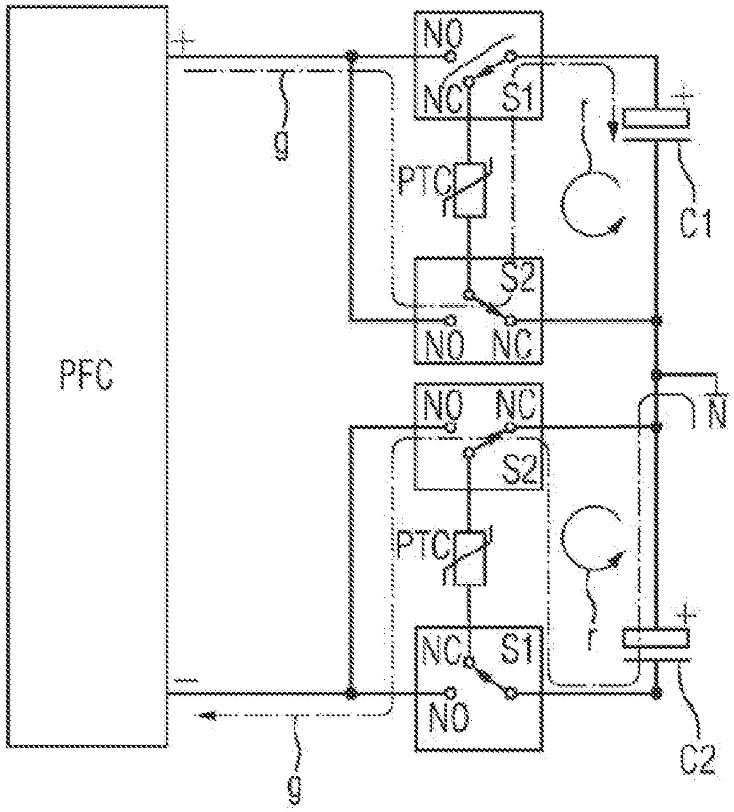

FIG. 7 shows a comparable vehicle charging circuit, wherein, however, in contrast to FIG. 6, the two intermediate circuit capacitors C1, C2 are connected to one another not by a configuration circuit but rather by a direct connection. Otherwise, like in FIG. 6, the desired discharge paths r and the desired precharge paths g also result in FIG. 7.

The invention claimed is:

1. A vehicle charging circuit comprising:

a rectifier device;

at least one intermediate circuit capacitor having a first pole and a second pole;

and at least one precharge/discharge circuit comprising a discharge resistor having a first pole and a second pole, wherein the rectifier device is connected to the intermediate circuit capacitor via the precharge/discharge circuit, wherein the second pole of the intermediate capacitor is connected to the second pole of the discharge resistor, wherein the precharge/discharge circuit has at least one first changeover switch that is configured, in a first position, to connect the first pole of the intermediate circuit capacitor to a first potential of the rectifier device, and, in a second position, connects the first pole of the intermediate circuit capacitor to the first pole of the discharge resistor, and wherein the changeover switch is configured to adopt the second switching position in the actuation-free state.

2. The vehicle charging circuit as claimed in claim 1, wherein the first changeover switch is designed as an electromechanical changeover switch that has a center connection that is connected to the intermediate circuit capacitor and that is able to be connected selectively to a first contact or a second contact of the changeover switch, wherein the discharge resistor is connected directly or indirectly to the first contact and the second contact is connected directly or indirectly to the rectifier device, and, in the actuation-free state of the changeover switch, the center connection is connected to the second contact.

3. The vehicle charging circuit as claimed claim 1, wherein a DC-DC voltage converter of the vehicle charging circuit is connected downstream of the intermediate circuit capacitor.

4. The vehicle charging circuit as claimed in claim 1, wherein the rectifier device is designed as an active rectifier or as a power factor correction filter.

5. The vehicle charging circuit as claimed in claim 1, wherein the precharge/discharge circuit has a precharge resistor and a switch designed as a normally closed contact or normally open contact that is connected in parallel with the precharge resistor, and the first changeover switch is connected to the first potential of the rectifier device via the parallel connection of the precharge resistor and the switch.

6. The vehicle charging circuit as claimed in claim 5, further comprising a neutral conductor connection and two of the precharge/discharge circuits and two of the intermediate circuit capacitors, wherein the intermediate circuit capacitors are connected to one another via an intermediate point that is connected to the neutral conductor connection, wherein a first of the precharge/discharge circuits is connected between the first potential of the rectifier device and a first of the intermediate circuit capacitors and a second of the precharge/discharge circuits is connected between the second potential of the rectifier device and a second of the intermediate circuit capacitors, wherein the discharge resistors of the two precharge/discharge circuits are connected to one another via the intermediate point, and the two precharge resistors and switches, in parallel therewith, of the precharge/discharge circuits are connected to different potentials of the rectifier device.

7. The vehicle charging circuit as claimed in claim 5, further comprising a neutral conductor connection and two of the precharge/discharge circuits and two of the intermediate circuit capacitors, wherein the intermediate circuit capacitors are connected to one another via a configuration circuit that is configured to selectively connect the intermediate circuit capacitors in parallel or in series and that is connected to the neutral conductor connection, wherein a first of the precharge/discharge circuits is connected between the first potential of the rectifier device and a first of the intermediate circuit capacitors and a second of the precharge/discharge circuits is connected between the second potential of the rectifier device and a second of the intermediate circuit capacitors, wherein the discharge resistors of the two precharge/discharge circuits are connected to one another via the configuration circuit, and the two precharge resistors and switches, in parallel therewith, of the precharge/discharge circuits are connected to different potentials of the rectifier device.

8. A vehicle charging circuit comprising:

a rectifier device;

at least one intermediate circuit capacitor; and at least one precharge/discharge circuit, wherein the rectifier device is connected to the intermediate circuit capacitor via the precharge/discharge circuit, wherein the precharge/discharge circuit has at least one first changeover switch that is configured, in a first position, to connect a first pole of the intermediate circuit capacitor to a first potential of the rectifier device, and, in a second position, connects the first pole of the intermediate circuit capacitor to the second pole of the intermediate circuit capacitor via a discharge resistor, and wherein the changeover switch is configured to adopt the second switching position in the actuation-free state, and wherein the precharge/discharge circuit has a second changeover switch in addition to the first changeover switch, wherein the first changeover switch is configured, in the second position, to connect the first pole of the intermediate circuit capacitor to the second pole of the intermediate circuit capacitor via the second changeover switch and the discharge resistor, wherein the second changeover switch is configured, in a first position, to connect the first changeover switch to the first potential of the rectifier device via a precharge resistor of the precharge/discharge circuit and, in a second position, to connect the first changeover switch to the second pole of the intermediate circuit capacitor via the discharge resistor.

9. The vehicle charging circuit as claimed in claim 8, further comprising a neutral conductor connection and two of the precharge/discharge circuits and two of the intermediate circuit capacitors, wherein the intermediate circuit capacitors are connected to one another via an intermediate point that is connected to the neutral conductor connection, wherein a first of the precharge/discharge circuits is connected between the first potential of the rectifier device and a first of the intermediate circuit capacitors and a second of the precharge/discharge circuits is connected between the second potential of the rectifier device and a second of the intermediate circuit capacitors, wherein the discharge resistors of the two precharge/discharge circuits are connected to one another via the intermediate point, and the two precharge resistors connect the respective changeover switches of the precharge/discharge circuits to different potentials of the rectifier device.

10. The vehicle charging circuit as claimed in claim 8, further comprising a neutral conductor connection and two of the precharge/discharge circuits and two of the intermediate circuit capacitors, wherein the intermediate circuit capacitors are connected to one another via a configuration circuit that is configured to selectively connect the intermediate circuit capacitors in parallel or in series and that is connected to the neutral conductor connection, wherein a first of the precharge/discharge circuits is connected between the first potential of the rectifier device and a first of the intermediate circuit capacitors and a second of the precharge/discharge circuits is connected between the second potential of the rectifier device and a second of the intermediate circuit capacitors, wherein the discharge resistors of the two precharge/discharge circuits are connected to one another via the configuration circuit, and the two precharge resistors connect the respective second changeover switches of the precharge/discharge circuits to different potentials of the rectifier device.

11. A vehicle charging circuit comprising:

a rectifier device;

at least one intermediate circuit capacitor; and at least one precharge/discharge circuit, wherein the rectifier device is connected to the intermediate circuit capacitor via the precharge/discharge circuit, wherein the precharge/discharge circuit has at least one first changeover switch that is configured, in a first position, to connect a first pole of the intermediate circuit capacitor to a first potential of the rectifier device, and, in a second position, connects the first pole of the intermediate circuit capacitor to the second pole of the intermediate circuit capacitor via a discharge resistor, and wherein the changeover switch is configured to adopt the second switching position in the actuation-free state, and wherein the precharge/discharge circuit has a second changeover switch in addition to the first changeover switch, wherein the first changeover switch is configured, in the second position, to connect the first pole of the intermediate circuit capacitor, via the discharge resistor, to the second changeover switch, which is connected to the second pole of the intermediate circuit capacitor, wherein the second changeover switch is configured, in a first position, to connect the discharge resistor to the first potential of the rectifier device, as a result of which the discharge resistor is given the additional function of precharging, and, in a second position, to connect the first changeover switch to the second pole of the intermediate circuit capacitor via the discharge resistor in order to discharge the intermediate circuit capacitor.

12. The vehicle charging circuit as claimed in claim 11, further comprising a neutral conductor connection and two of the precharge/discharge circuits and two of the intermediate circuit capacitors, wherein the intermediate circuit capacitors are connected to one another via an intermediate point that is connected to the neutral conductor connection, wherein a first of the precharge/discharge circuits is connected between the first potential of the rectifier device and a first of the intermediate circuit capacitors and a second of the precharge/discharge circuits is connected between the second potential of the rectifier device and a second of the intermediate circuit capacitors, wherein the second changeover switches of the two precharge/discharge circuits are connected to one another via the intermediate point, and the two first changeover switches connect the respective discharge resistor of the precharge/discharge circuits to different potentials of the rectifier device.

13. The vehicle charging circuit as claimed in claim 11, further comprising a neutral conductor connection and two of the precharge/discharge circuits and two of the intermediate circuit capacitors, wherein the intermediate circuit capacitors are connected to one another via a configuration circuit that is configured to selectively connect the intermediate circuit capacitors in parallel or in series and that is connected to the neutral conductor connection, wherein a first of the precharge/discharge circuits is connected between the first potential of the rectifier device and a first of the intermediate circuit capacitors and a second of the precharge/discharge circuits is connected between the second potential of the rectifier device and a second of the intermediate circuit capacitors, wherein the second changeover switches of the two precharge/discharge circuits are connected to one another via the configuration circuit, and the two first changeover switches connect the respective discharge resistor of the precharge/discharge circuits to different potentials of the rectifier device.

14. The vehicle charging circuit as claimed in claim 1, further comprising a monitoring unit that is configured (a) to monitor a voltage across the at least one intermediate circuit capacitor and to output a fault signal if a predefined voltage limit is exceeded; or (b) to monitor the power consumed by the discharge resistor and, from the power, to form a temperature increase of the discharge resistor resulting from the power, and to output a fault signal if the temperature increase is above a limit; or (c) to ascertain whether complete discharging of the at least one intermediate circuit capacitor is not possible, or not possible within a predefined period of time, and, if this is the case, to charge the at least one intermediate circuit capacitor again; or (d) to output a fault signal if complete discharging takes longer than a predefined period of time.

* * * * *